US 7,013,349 B2

(12) United States Patent
Idsinga

(10) Patent No.: US 7,013,349 B2
(45) Date of Patent: *Mar. 14, 2006

(54) MANAGING LINKS BETWEEN PROCESSOR-BASED SYSTEMS

(75) Inventor: Andrew S. Idsinga, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/114,741

(22) Filed: Apr. 25, 2005

(65) Prior Publication Data

US 2005/0185592 A1 Aug. 25, 2005

Related U.S. Application Data

(63) Continuation of application No. 09/754,554, filed on Jan. 4, 2001.

(51) Int. Cl.
G06F 15/173 (2006.01)
(52) U.S. Cl. .............. 709/242; 709/203; 709/224; 709/229; 709/237; 370/351; 340/10.1
(58) Field of Classification Search ........ 709/203, 709/222, 223–225, 227–229, 237, 238, 242; 370/235, 254, 255, 351, 400, 410; 340/825, 340/10.1, 10.3, 10.4
See application file for complete search history.

(56) References Cited

U.S. PATENT DOCUMENTS

| 5,732,086 | A | | 3/1998 | Liang et al. | |
| 5,758,077 | A | * | 5/1998 | Danahy et al. | 709/201 |
| 5,796,736 | A | | 8/1998 | Suzuki | |
| 6,101,528 | A | | 8/2000 | Butt | |
| 6,182,075 | B1 | * | 1/2001 | Hsu | 707/10 |
| 6,182,136 | B1 | | 1/2001 | Ramanathan et al. | |
| 6,253,337 | B1 | | 6/2001 | Maloney et al. | |
| 6,327,252 | B1 | | 12/2001 | Silton et al. | |
| 6,363,416 | B1 | * | 3/2002 | Naeimi et al. | 709/209 |
| 6,493,715 | B1 | * | 12/2002 | Funk et al. | 707/10 |
| 6,512,768 | B1 | | 1/2003 | Thomas | |
| 6,549,932 | B1 | | 4/2003 | McNally et al. | |
| 6,601,093 | B1 | * | 7/2003 | Peters | 709/220 |
| 6,604,142 | B1 | * | 8/2003 | Bertrand et al. | 709/227 |
| 6,675,196 | B1 | * | 1/2004 | Kronz | 709/203 |
| 6,757,262 | B1 | * | 6/2004 | Weisshaar et al. | 370/310 |
| 6,760,306 | B1 | | 7/2004 | Pan et al. | |
| 6,795,403 | B1 | | 9/2004 | Gundavelli | |
| 2001/0003191 | A1 | * | 6/2001 | Kovacs et al. | |
| 2001/0051981 | A1 | * | 12/2001 | Davison et al. | 709/203 |
| 2002/0013833 | A1 | * | 1/2002 | Wyatt et al. | 709/220 |
| 2002/0044533 | A1 | | 4/2002 | Bahl et al. | |

(Continued)

FOREIGN PATENT DOCUMENTS

JP 10210029 A 8/1998

(Continued)

Primary Examiner—Anthony Knight
Assistant Examiner—Crystal J. Barnes
(74) Attorney, Agent, or Firm—Joni D. Stutman-Horn

(57) ABSTRACT

Software on one system may query nodes which need to be addressed by clients on the system to determine whether those nodes are accessible. The software may query those nodes by sending a discovery message to those nodes and monitoring for a discovery response. If the discovery response is received, the software clients may be notified that the connection is existing and can be used to access the remote nodes.

13 Claims, 4 Drawing Sheets

U.S. PATENT DOCUMENTS

| | | |
|---|---|---|
| 2002/0075834 A1 | 6/2002 | Shah et al. |
| 2002/0075870 A1 | 6/2002 | de Azevedo et al. |
| 2003/0095504 A1 | 5/2003 | Ogier |

FOREIGN PATENT DOCUMENTS

| | | |
|---|---|---|
| WO | WO 9957853 A1 | 11/1999 |

* cited by examiner

MANAGING LINKS BETWEEN PROCESSOR-BASED SYSTEMS

CROSS REFERENCE TO RELATED APPLICATIONS

This application is a continuation of U.S. patent application Ser. No. 09/754,554, entitled "Managing Links Between Processor-Based Systems," filed on Jan. 4, 2001 by Andrew S. Idsinga, assigned to a common assignee, the entire subject matter which is herein incorporated by reference.

BACKGROUND

This invention relates generally to processor-based systems which link to other processor-based systems using appropriate connections.

Processor-based systems may communicate with one another over communication links. These links may be wired or wireless links. For example, two processor-based systems may communicate over a network which may be a wired connection or they may communicate using a radio frequency connection.

Software applications on one system often need to understand what services are available from other nodes on the same network. As one example, a browser on a private intranet may need to know whether a web proxy service that resides on another system is available. In a mobile network environment, the physical network link between one or more nodes may change from one second to the next due to a variety of intermittent factors including radio signal propagation, battery life and physical proximity between two processor-based systems. Not only may the state of the link change, but in many systems, the address of a particular node may also change dynamically.

Thus, there is a need to enable applications at one node to know the state of a link which can connect applications on one node to specific services on one or more remote nodes.

DETAILED DESCRIPTION

Figure 1:
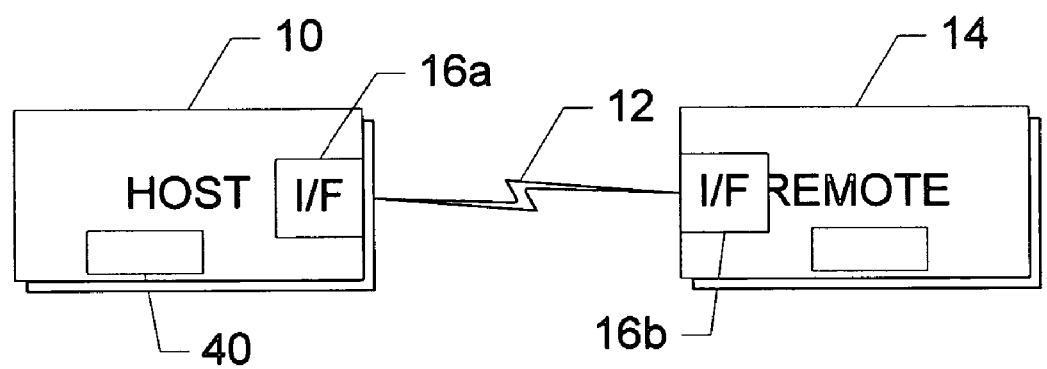
FIG. 1 is a schematic depiction of a system in accordance with one embodiment of the present invention.

As shown in FIG. 1, a host processor-based system 10 may communicate with a remote processor-based system 14 via a link 12. The link 12 may be hard wired or may form a wireless connection. For example, the link 12 may be a wireless link which links the remote processor-based system 14 with the host processor-based system 10. The remote processor-based system 14 may be a wireless device such as a web tablet or a portable device such as a personal digital assistant, a cellular telephone or an MP3 player, as examples. Conversely, the host processor-based system 10 in some examples may be a desktop computer, a laptop computer, a processor-based appliance or any other processor-based system.

The host processor-based system 10 may include a storage 40 that stores software for managing the link 12. The host processor-based system 10 may include an interface 16a to the link 12 and similarly the remote processor-based system 14 may include an interface 16b to the link 12. A state machine on the system 10 may be dynamically tuned for the characteristics of the network that includes the system 10. Thus, in one example, where the link 12 is a wireless link, the state machine's timing may be tuned for the timing and throughput characteristics of the wireless network.

Figure 2:
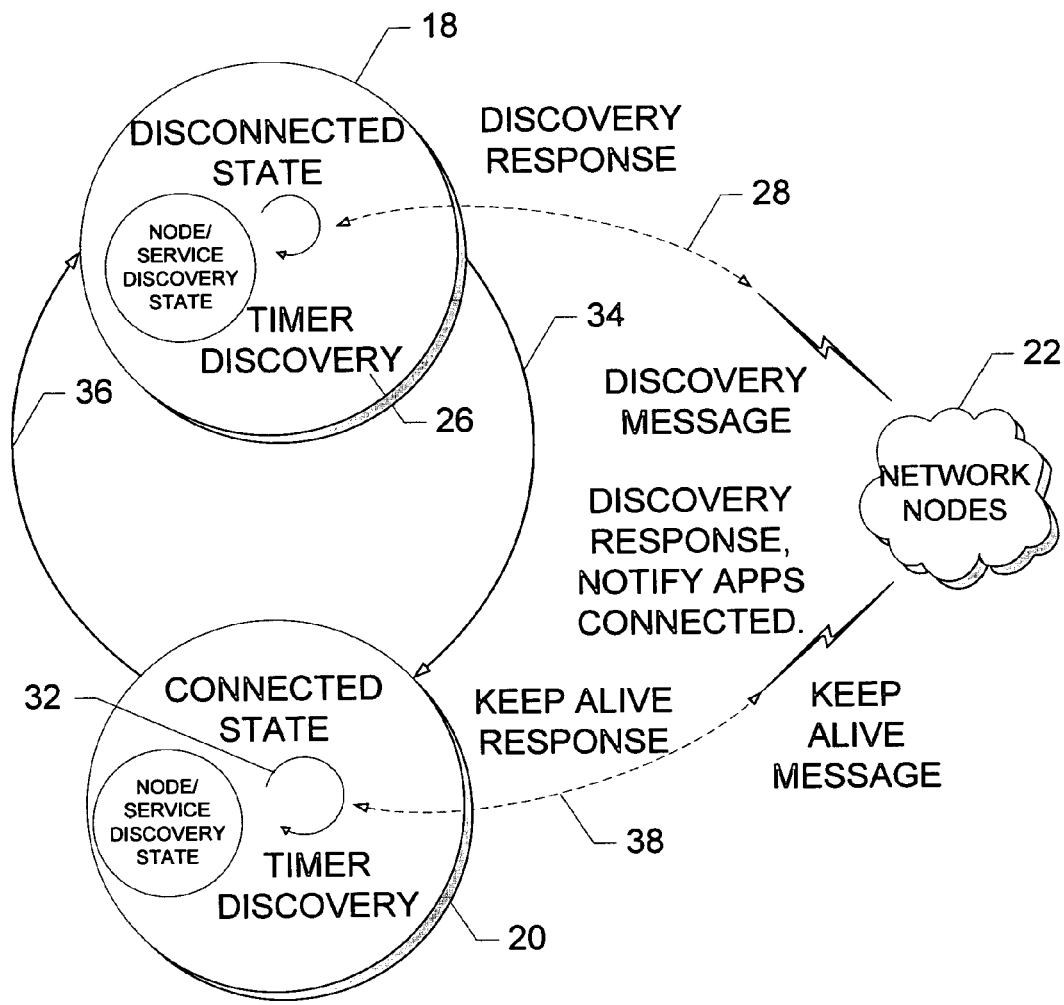
FIG. 2 is a state diagram for software resident on the host system shown in FIG. 1 in one embodiment of the present invention.

Referring to FIG. 2, a state diagram for the software stored on the storage 40 on the host processor-based system 10 includes two distinct states called the disconnected state 18 and the connected state 20. These states may be implemented through a state machine in one embodiment. Two or more nodes may be physically connectable, but still may be "disconnected" as far as the software is concerned. In the disconnected state 18, from the software perspective, the host processor-based system 10 is not connected to a network node 22 that may be, for example, the remote processor-based system 14. In the connected state, the host processor-based system 10 and remote processor-based system 14 may be connected over the link 12.

The software may transition, as indicated at 34, from the disconnected state 18 to the connected state 20 in response to an appropriate discovery response received over the network from nodes 22. Similarly, the software may transition, as indicated at 36, from the connected state 20 to the disconnected state 18 when a keep alive response 38 is not received in response to a query made by the software or in case of a time out 32. When the system 10 has transitioned to the disconnected state 18, applications that may wish to use the link 12 may be notified that the link has been lost.

In the disconnected state 18, discovery queries may be posed to the nodes 22, as indicated at 28, at timed intervals 26 or in other sequences. In one embodiment, the node(s) 22 may correspond to the system 14. If a response to the discovery query is received, indicating that the node 22 is available and is connectable the software will transition from the disconnected state 18 to the connected state 20 as indicated at 34.

In the connected state 20, the software periodically queries the connection to the node(s) 22 to make sure that the connection(s) is/are still alive. In particular, a keep alive message 38 is sent to the node(s) 22, and if a response is not received after a particular time period, the software will transition to the disconnected state as indicated at 36.

Figure 3A:
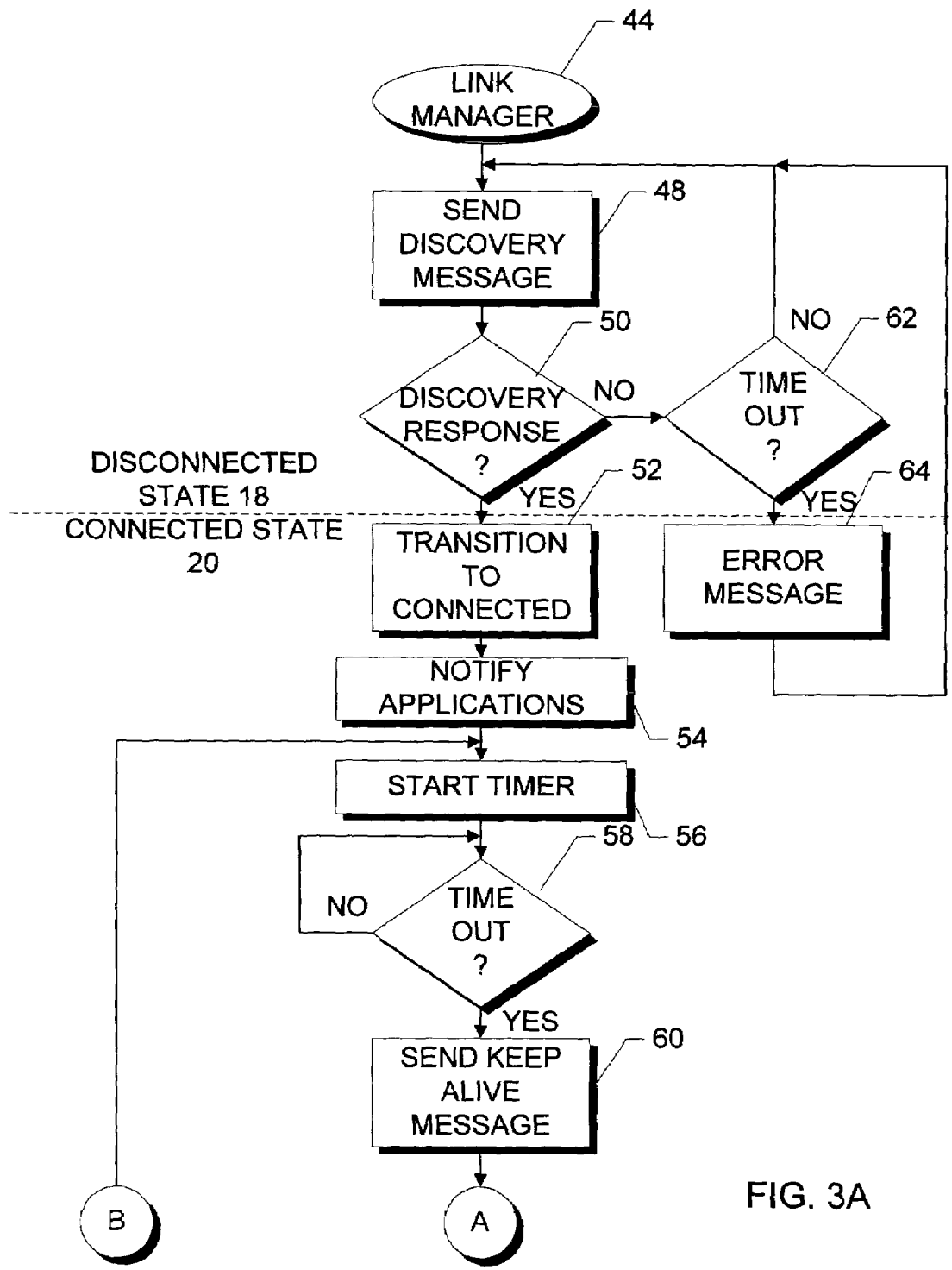
FIGS. 3A and 3B comprise a flow chart for software stored on the host system shown in FIG. 1 in accordance with one embodiment of the present invention.

Referring to FIG. 3A, software 44, to manage the link in accordance with one embodiment of the present invention, may be stored on the storage 40 of the host processor-based system 10. Upon system initialization, a discovery message is sent automatically as indicated in block 48. In one embodiment, the discovery message may be multicast to a plurality of nodes 22. A check at diamond 50 determines whether a discovery response is received indicating that the link 12 is available and the node(s) 22 is(are) accessible. If so, the software 44 transitions to the connected state 20 from the disconnected state 18 as indicated in block 52. Applications may be notified of the availability of the link as indicated in block 54.

A timer is started as indicated in block 56. At diamond 58 a check determines whether the timer has timed out. If so, a keep alive message is sent to the appropriate node(s) 22 in the connected state 20 as indicated in block 60.

Figure 3B:
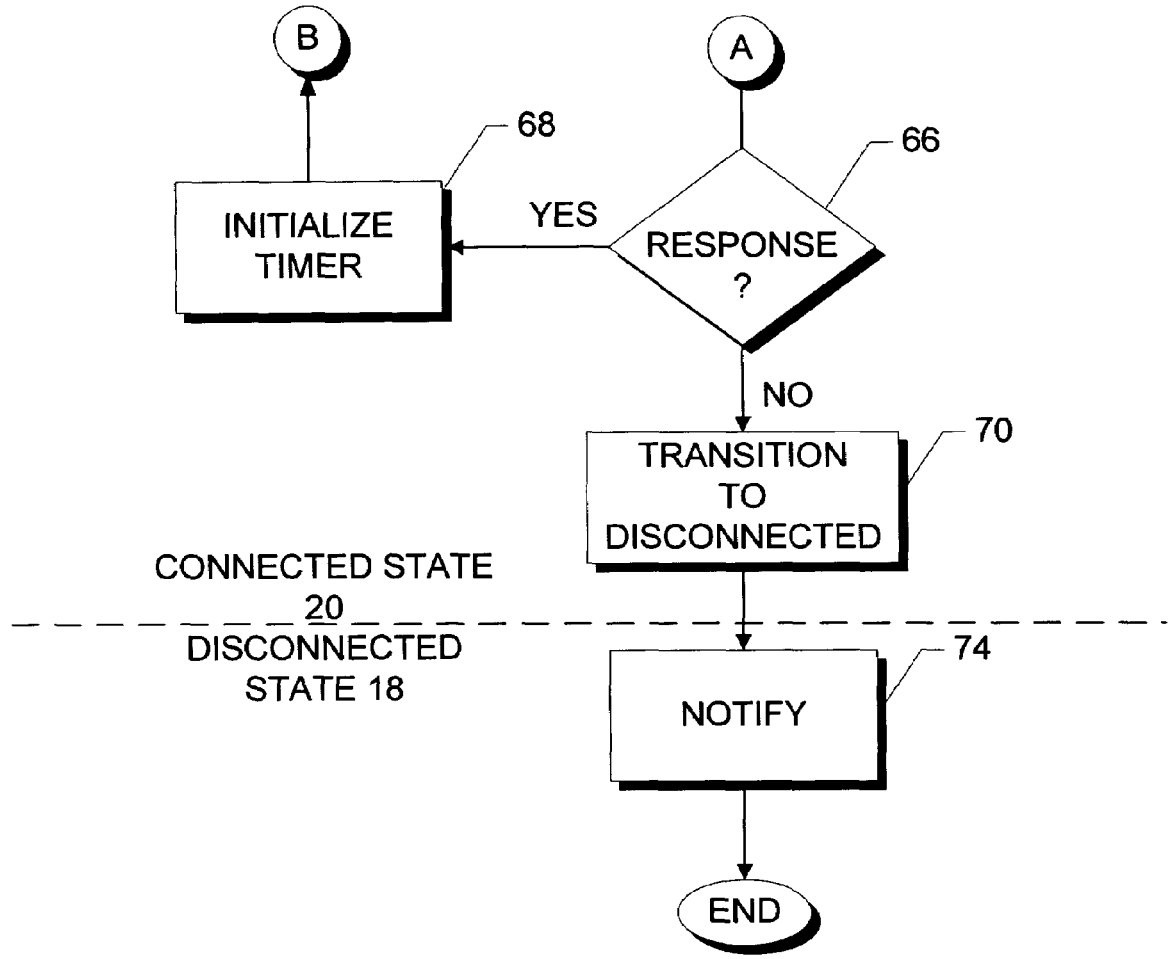

Moving to FIG. 3B, if a response is not received as determined in diamond 66, the software 44 transitions to the disconnected state 18 as indicated in block 70. Next, clients are notified of the link disconnection in block 74. Conversely, if a response is received to the keep alive request as determined in diamond 66, a timer is initialized, as indicated in block 68, and the timer is restarted in block 56 as the flow iterates.

Similarly, in the disconnected state 18, if a discovery response is not received after a time out, as determined in diamond 62, the flow iterates, continuing to send discovery messages until the node is located. If a time out occurs, an error message may be generated as indicated in block 64 and the flow may recycle.

In some embodiments of the present invention, by using node discovery to determine the state of the link, rather than a hardware based link state determination, the link state determination is based on real responses from actual nodes providing software services. This approach may tend to be more accurate, reliable and timely. Any time based discovery or keep alive queries are tunable for different applications and different physical network links. For example, the time outs indicated in diamonds 58 and 62 of FIG. 3 may be adjusted for particular network characteristics in some applications. In some embodiments, immediate or asynchronous link state information may be provided to applications as well as hardware or network protocol specific notifications.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   automatically sending a discovery message, by a first node on a network, to a second node on a network;
   enabling access to the second node if a response to the discovery message is received; and
   automatically checking a link to the second node to make sure that the second node is still accessible to the first node,
   wherein the first node on the network comprises a host-based processor system running a plurality of client applications, and wherein the second node on the network provides at least one application service accessible to the first node when the first and second node are linked, and wherein each of the at least one application service corresponds to one of the plurality of client applications running on the host processor.

2. The method of claim 1 further including automatically sending a message to determine whether the second node is still accessible after said response to said discovery message is received.

3. The method of claim 1 including notifying a client application running on the first node, the client application wishing to access the second node when a state transition is made based on a response to a discovery message being received.

4. The method of claim 1, including automatically checking the second node at timed intervals in order to maintain a connected state.

5. A method comprising:
   automatically sending a discovery message, by a first node on a network, to a second node on a network;
   enabling access to the second node if a response to the discovery message is received;
   automatically checking a link to the second node to make sure that the second node is still accessible to the first node, wherein the first node on the network comprises a host-based processor system running one or more client applications, and wherein the second node on the network provides at least one application service accessible to the first node when the first and second node are linked; and
   implementing a state machine with a connected and a disconnected state and automatically transitioning from the disconnected state to the connected state when a response to a discovery message is received.

6. An article comprising a medium storing instructions that enable a processor-based system to:
   send a discovery message, by a first node, to a second node in response to a request by a client application to access the second node;
   enable access to the second node if a response to the discovery message is received; and
   automatically check a link to the second node to make sure that the second node is still accessible to the first node,
   wherein the first node comprises a host-based processor system running a plurality of client applications, and wherein the second node on the network provides at least one application service accessible to the first node when the first and second node are linked, and wherein each of the at least one application service corresponds to one of the plurality of client applications running on the host processor.

7. The article of claim 6, further storing instructions that enable the processor-based system to automatically send a message to determine whether the second node is still accessible after said response to said discovery message is received.

8. The article of claim 6, further storing instructions that enable the processor-based system to notify a client application running on the first node, the client application wishing to access the second node when a state transition is made based on a response to a discovery message being received.

9. The article of claim 6, further storing instructions that enable the processor-based system to automatically check the second node at timed intervals.

10. An article comprising a medium storing instructions that enable a processor-based system to:
    send a discovery message, by a first node, to a second node in response to a request by a client application to access the second node;
    enable access to the second node if a response to the discovery message is received;
    automatically check a link to the second node to make sure that the second node is still accessible to the first node, wherein the first node comprises a host-based processor system running one or more client applications, and wherein the second node on the network provides at least one application service accessible to the first node when the first and second node are linked; and
    enable the processor-based system to implement a state machine with a connected and a disconnected state and to automatically transition from the disconnected state to the connected state when a response to a discovery message is received.

11. A system comprising:
    a network interface; and
    a storage coupled to said network interface, said storage storing instructions that enable said system to automatically send a discovery message to a node over said interface to access the node and to enable node access if a response to the discovery message is received, said storage further storing instructions that enable said system to automatically check said node at timed intervals in order to maintain a connected state, wherein a plurality of client applications are to run on said system, and wherein said discovery message is sent to the node as a result of a request from one of the plurality of client applications to access said node, and the requested access is for an application service corresponding to the one of the plurality of client applications.

12. The system of claim 11, wherein said storage stores instructions to cause said system to automatically send a message to determine whether the node is still accessible after said response to said discovery message is received.

13. A system comprising:
a network interface; and
a storage coupled to said network interface, said storage storing instructions that enable said system to automatically send a discovery message to a node over said interface to access the node and to enable node access if a response to the discovery message is received, said storage further storing instructions that enable said system to automatically check said node at timed intervals in order to maintain a connected state, wherein one or more client applications are to run on said system, and wherein said discovery message is sent to the node as a result of a request from one of the client applications to access said node, wherein said storage further stores instructions that enable said system to implement a state machine with a connected and a disconnected state and automatically transition from the disconnected state to the connected state when a response to a discovery message is received.

* * * * *